United States Patent
Takagi et al.

[11] Patent Number: 6,070,930
[45] Date of Patent: Jun. 6, 2000

[54] STRUCTURE FOR POSITIONING WINDOW SHIELD PANEL FOR VEHICLE AND METHOD OF MOUNTING WINDOW SHIELD PANEL

[75] Inventors: Masaaki Takagi; Tomoyoshi Ohnuki, both of Kanagawa-ken, Japan

[73] Assignees: Nissan Motor Co., Ltd.; Piolax Inc., both of Kanagawa-ken, Japan

[21] Appl. No.: 09/109,045

[22] Filed: Jul. 2, 1998

[30] Foreign Application Priority Data

Jul. 4, 1997 [JP] Japan .................... P9-180008

[51] Int. Cl.[7] ...................................... B60J 1/02
[52] U.S. Cl. ............... 296/96.21; 296/84.1; 296/146.15; 296/201
[58] Field of Search .............. 296/96.21, 84.1, 296/146.15, 201; 52/716.5, 716.6, 716.7, 204.7, 204.519

[56] References Cited

U.S. PATENT DOCUMENTS

| | | | |
|---|---|---|---|
| 4,396,223 | 8/1983 | Drexel et al. | 296/201 |
| 5,489,135 | 2/1996 | Lipinski | 296/96.21 |
| 5,531,496 | 7/1996 | Zbinden et al. | 296/96.21 |
| 5,695,236 | 12/1997 | Banno et al. | 296/96.21 |

FOREIGN PATENT DOCUMENTS 5-32043  4/1993  Japan .

*Primary Examiner*—D. Glenn Dayoan
*Assistant Examiner*—Lori L. Coletta
*Attorney, Agent, or Firm*—McDermott, Will & Emery

[57] ABSTRACT

A flange having a first flange close to a roof panel and a second flange close to a roof rail which are mutually overlapped with each other is disposed in a peripheral edge of an opening portion of a vehicle body. A peripheral edge of a window shield panel is bonded on the flange. A spacer inserting port open in both ends is provided between the first flange and the second flange. A first spacer has an inserting portion and a first engaging portion. The inserting portion is inserted into the spacer inserting port from one of the openings, whereby the first spacer is fixed to the flange and the first engaging portion projects over an outer surface of the flange. The second spacer is fixed to a peripheral edge of the window shield panel. The second spacer has a second engaging portion engageable with the first engaging portion. When the first and second engaging portions are mutually engaged with each other, the window shield panel is positioned with respect to the flange. Accordingly, a position that both the spacers are engaged is defined without being affected by a spring back due to a press molding of the flange. Therefore, an accuracy that the window shield panel is mounted is improved.

15 Claims, 3 Drawing Sheets

STRUCTURE FOR POSITIONING WINDOW SHIELD PANEL FOR VEHICLE AND METHOD OF MOUNTING WINDOW SHIELD PANEL

The content of Application No. TOKUGANHEI 9-180008, filed Jul. 4, 1997, in Japan and on which the priority of this application is based is hereby incorporated by reference.

BACKGROUND OF THE INVENTION

The present invention relates to a structure for positioning a window shield panel such as a front window panel, a rear window panel and the like, particularly a window shield panel bonded and fixed on a flange in an opening portion of a vehicle body, and a method of mounting the same.

Conventionally, as a structure of positioning a window shield panel of a bonding and fixing type, a structure disclosed in Japanese Utility Model Application Laid-Open No. 5-32043 is well known. The structure mentioned above is provided with a notch portion formed on an upper line portion of a flange disposed in a peripheral edge of an opening portion of a vehicle body, a locking piece upward bent from an edge of the notch portion, a contact piece disposed near an upper edge portion of a window shield panel and engaged with the locking piece, and a hook piece engaged with a lower surface of the edge of the notch portion. The window shield panel is positioned to the flange by engaging and attaching the hook piece to the lower surface of the notch edge as well as by engaging the contact piece with the locking piece.

However, it is hard to increase an accuracy for bending the locking piece due to a spring back of the bent vehicle body panel. Accordingly, a slippage tends to be generated at an engaging position between the locking piece and the contact piece. When the slippage is generated at the engaging position between the locking piece and the contact piece, the hook piece tends to get out of place from the lower surface of the edge of the notch.

SUMMARY OF THE INVENTION

It therefore is an object of the present invention to provide a positioning structure by which a windshield panel is securely positioned with respect to an opening portion of a vehicle body.

In order to achieve the object mentioned above, a structure for positioning a windshield panel for a vehicle in accordance with the present invention is provided with a flange, a windshield panel, a hollow and first and second spacers. The flange is disposed in a peripheral edge of an opening portion of a vehicle body. The flange has a first member and a second member mutually overlapping with each other. The windshield panel has a peripheral edge bonded on the flange. The hollow is formed between the first member and the second member. The hollow has a first opening. The first spacer has an inserting portion and a first engaging portion. The first spacer is fixed to the flange when the inserting portion is inserted into the hollow from the first opening, and the first engaging portion projects above an outer surface of the flange. The second spacer has a second engaging portion engageable with the first engaging portion. The windshield panel is positioned with respect to the flange when the first and second engaging portions are mutually engaged with each other.

When the windshield panel is mounted, at first, the first spacer is mounted to the flange by inserting the inserting portion into the hollow from the first opening. Next, the first engaging portion projecting above the outer surface of the flange is engaged with the second engaging portion of the second spacer fixed to the peripheral edge of the windshield panel. Accordingly, the windshield panel is positioned with respect to the flange. Finally, the peripheral edge of the windshield panel is bonded on the flange.

In this case, the first and second spacers are securely engaged at a desired position without being affected by a spring back in accordance with a press-molding of the flange. Accordingly, the windshield panel is securely positioned with respect to the opening portion of the vehicle body. As a result, an accuracy of mounting the windshield panel is improved.

DESCRIPTION OF THE PREFERRED EMBODIMENTS

A first embodiment in accordance with the present invention will be described below with reference to FIGS. 1 and 2.

In this embodiment, an explanation is given to a front windshield (hereinafter, simply refer to a windshield) as an example of a windshield panel.

Figure 1:
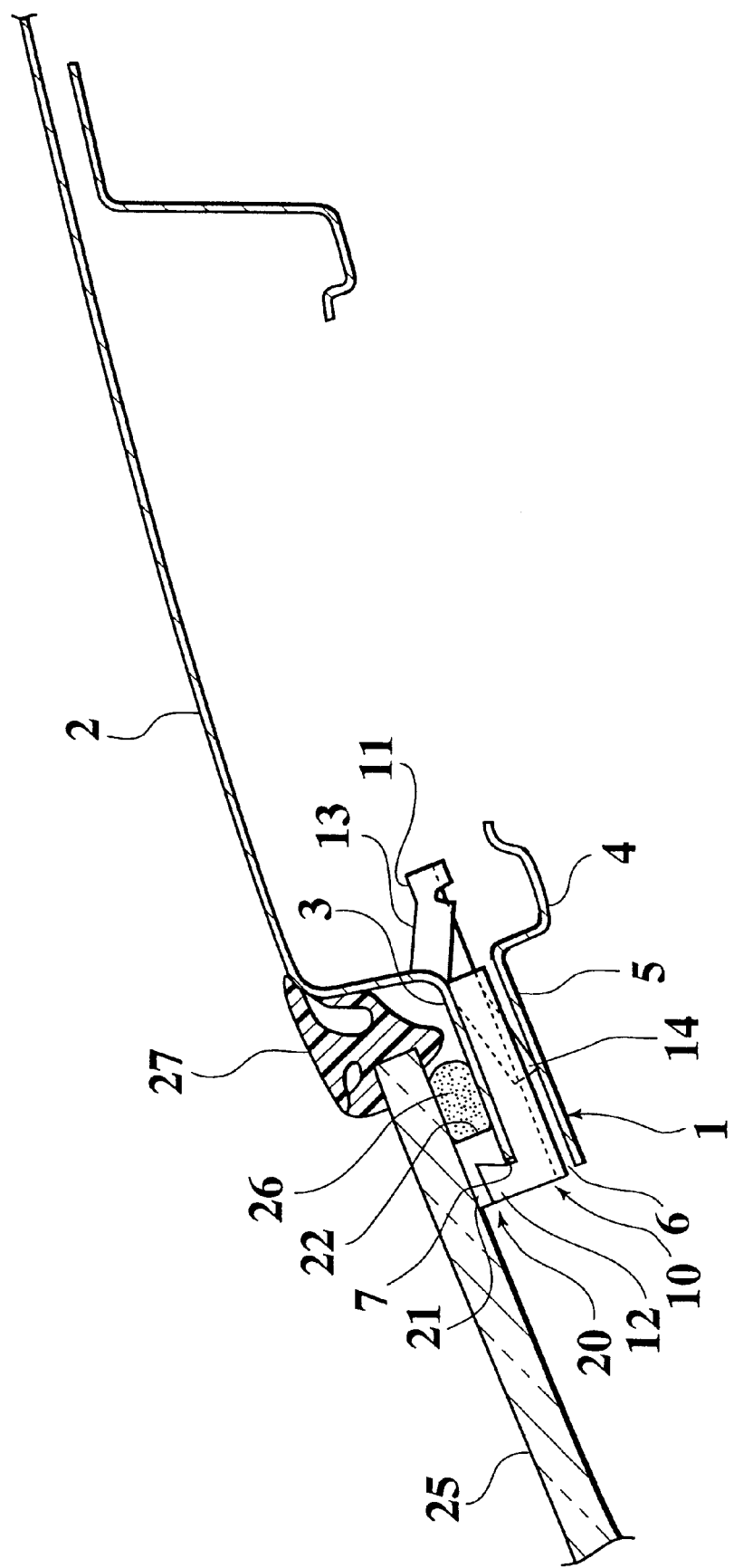
FIG. 1 is a cross sectional view which shows a first embodiment in accordance with the present invention.
Figure 2:
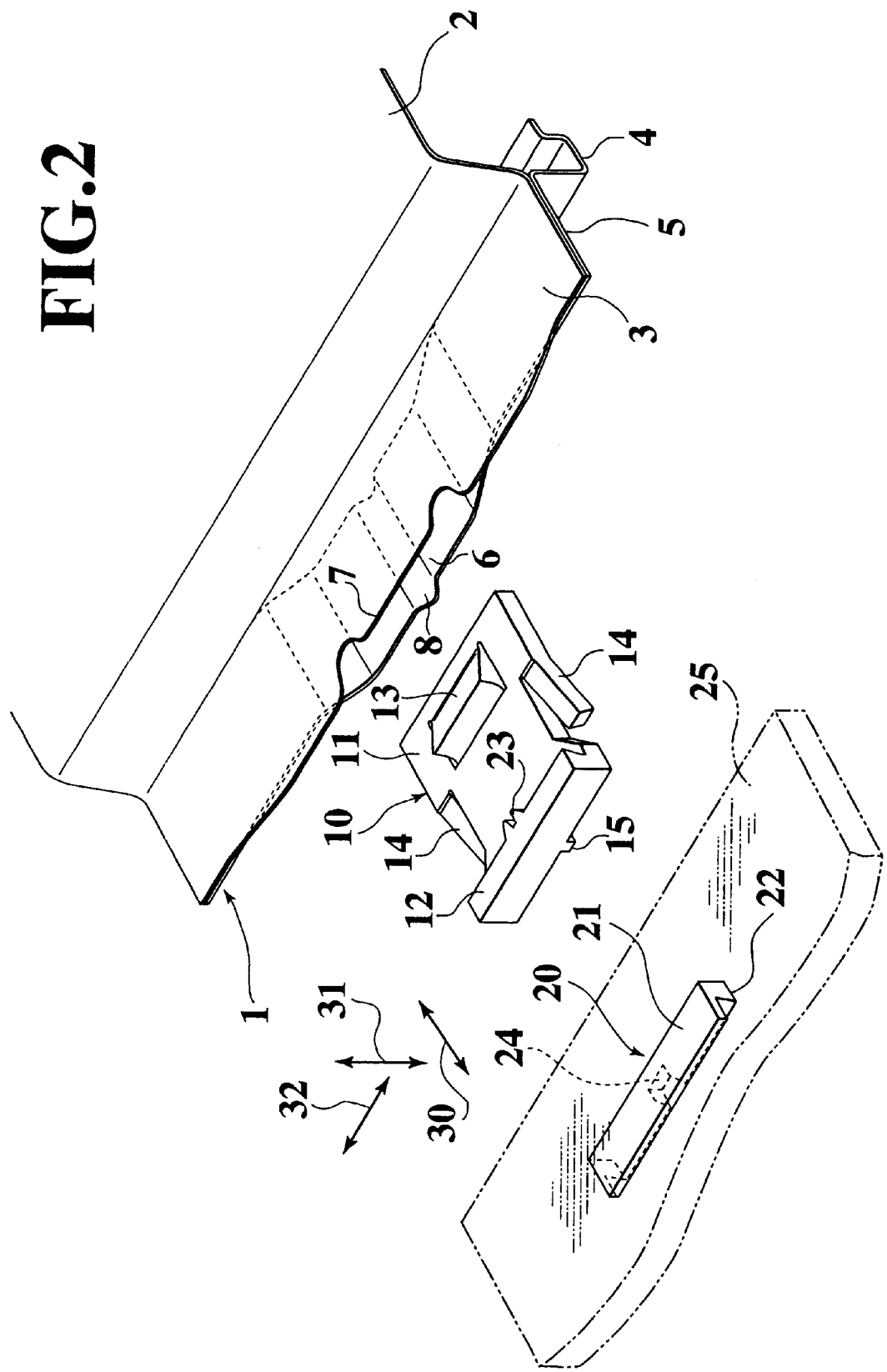
FIG. 2 is a exploded perspective view of FIG. 1.

As shown in FIGS. 1 and 2, a flange 1 is disposed in a peripheral edge of an opening portion of a vehicle body. An upper line portion of the flange 1 is constituted by a first flange 3 close to a roof panel 2 and a second flange 5 close to a roof rail 4. Both the flanges 3 and 5 are formed in a plate shape. The first flange 3 integrally extends with the roof panel 2 from a step-like portion bent in an end portion of the roof panel 2. The front roof rail 4 extends in a direction of a vehicle width below the end portion of the roof panel 2. The second flange 5 is bent and extends from an end portion of the front roof rail 4. Both the flanges 3 and 5 are mutually overlapped with each other, and bonded by a spot welding.

A hollow spacer inserting port 6 having an opening in both ends is provided in a part of the upper line portion of the flange 1, for example, both right and left sides. The spacer inserting port 6 is formed between both the flanges 3 and 5 by bending the first flange 3 and the second flange 5 in a direction opposing to each other.

A notch portion 7 receiving an engaging portion 12 of a flange end spacer 10 mentioned below is formed in an upper edge of one of the openings in the spacer inserting port 6. A positioning groove 8 is formed in a center portion of a bottom wall in the spacer inserting port 6. The positioning groove 8 extends in a direction that the engaging portion 12 is inserted to the spacer inserting port 6.

The flange end spacer 10 is provided with a thrusting portion 11 and the engaging portion 12. The flange end spacer 10 is made of an elastic material such as a rubber, a synthetic resin and the like. The thrusting portion 11 is inserted into the spacer inserting port 6 and fixed thereto. The engaging portion 12 is received in the notch portion 7 and projects above the flange 1.

A hook portion 13 passing through the spacer inserting port 6 and engaging with a bent portion of the first flange 3

(a peripheral edge portion of the other of the openings in the spacer inserting port 6) integrally projects from the center of the end portion in the thrusting portion 11.

A spring piece 14 is integrally formed in both side portions of the thrusting portion 11. The spring piece 14 is elastically brought into contact with the bottom wall of the spacer inserting port 6, and brings the thrusting portion 11 into contact with the upper wall of the spacer inserting port 6 in a pressing manner by a reacting force thereof.

The spring piece 14 obliquely extends from a front end of the inserting direction to the spacer inserting port 6 toward a rear end in such a manner as to be capable of being smoothly inserted without being hooked to the edge of the lower opening in the spacer inserting port 6 at a time of inserting the thrusting portion 11 to the spacer inserting port 6.

A projecting portion 15 engaging with the positioning groove 8 in the bottom wall of the spacer inserting port 6 is integrally formed in the center portion of the bottom surface in the thrusting portion 11.

The panel end spacer 20 is made of an elastic material which is the same as that of the flange end spacer 10. The panel end spacer 20 is mounted near the upper edge of a windshield panel 25. The panel end spacer 20 is disposed at a position corresponding to the flange end spacer 10 fixed to the flange 1.

The panel end spacer 20 is provided with a base portion 21 and an engaging portion 22. The base portion 21 is bonded and fixed to the surface of the windshield panel 25 by means of a suitable adhesive. The engaging portion 22 is engaged with the engaging portion 12 of the flange end spacer 10.

The engaging portion 12 of the flange end spacer 10 and the engaging portion 22 of the panel end spacer 20 have hook shapes which are mutually meshed with each other in a first direction 30 in which the flange 1 extends (a direction substantially parallel to the windshield panel 25) and a second direction 31 perpendicular to the flange 1 (a direction substantially perpendicular to the windshield 25).

Convex and recess portions mutually engaging with each other are formed in the edges of the engaging portions 12 and 22. Accordingly, a convex portion 23 is formed in the center portion of the engaging portion 12, and a recess portion 24 is formed in the center portion of the engaging portion 22. In this case, in an opposing manner to the above, the recess portion and the convex portion may be respectively provided in the engaging portion 12 and the engaging portion 22.

The peripheral edge portion of the windshield panel 25 is bonded and fixed on the flange 1 by means of an adhesive 26. A decorative window molding 27 is fitted and fixed to the peripheral edge of the windshield panel 25.

In accordance with the structure mentioned above, the windshield 25 is mounted in the following manner.

At first, the flange end spacer 10 is inserted and fixed to the spacer inserting port 6 disposed in the upper line portion of the flange 1.

Next, the engaging portion 22 of the panel end spacer 20 is engaged with and attached to the engaging portion 12 of the flange end spacer 10 by applying the adhesive 26 to the peripheral edge portion of the windshield panel 25 and aligning the windshield panel 25 with the flange 1. Accordingly, the windshield 25 is positioned and temporarily held by both the spacers 10 and 20.

Finally, the windshield panel 25 is pressed onto the flange 1. Accordingly, the windshield panel 25 is adhered onto the flange 1 by means of the adhesive 26.

In this case, as mentioned above, the flange end spacer 10 is inserted and fixed to the spacer inserting port 6 formed by partly detaching the portion in which the first flange 3 and the second flange 5 are overlapped. Then, the engaging portion 12 of the flange end spacer 10 and the engaging portion 22 of the panel end spacer 20 adhered to the windshield panel 25 are mutually engaged with each other. Accordingly, a position of engaging the flange end spacer 10 with the panel end spacer 20 is defined without being affected by a spring back due to a press molding of the flange 1. Therefore, the upper edge portion of the windshield panel 25 is securely positioned and fixed to the upper line portion of the flange 1 in the opening portion of the vehicle body. As a result, an accuracy of mounting the windshield panel 25 is improved.

Further, an operation of assembling the flange end spacer 10 to the upper line portion of the flange 1 is performed by inserting the thrusting portion 11 of the flange end spacer 10 into the spacer inserting port 6. At this time, in a state that the projecting portion 15 in the bottom surface of the flange end spacer 10 is engaged with the positioning groove 8 in the bottom wall of the spacer inserting port 6, the thrusting portion 11 is inserted into the spacer inserting port 6. Due to this engagement, a positioning of the thrusting portion 6 in right and left directions of the spacer inserting port 6 (a direction perpendicular to the inserting direction of the thrusting portion 6) is performed. Accordingly, the thrusting portion 6 is guided and smoothly inserted.

Still further, when the thrusting portion 6 is completely thrust, the hook portion 13 above the thrusting portion 11 passes through the spacer inserting port 6 and is engaged with the bent base portion of the first flange 3. In this state, the spring piece 14 is elastically brought into contact with the bottom wall of the spacer inserting port 6, and the thrusting portion 11 is brought into contact with the upper wall of the spacer inserting port 6 in a pressing manner due to the reacting force. Accordingly, the hook portion 13 is securely engaged with the bent base portion of the first flange 3, and the flange end spacer 10 is assembled to a desired position.

As a result, the flange end spacer 10 is securely fixed in a one-touch manner, so that a mounting operability is improved.

Further, since the thrusting portion 11 is brought into contact with the upper wall of the spacer inserting port 6 in a pressing manner due to the reacting force of the spring piece 14, an amount of projecting the engaging portion 12 above the flange 1 is sufficiently secured. Still further, since the engaging portion 12 is received in the notch portion 7 of the upper opening edge in the spacer inserting port 6, a positioning of the flange end spacer 10 in the right and left directions is securely performed. Accordingly, the flange end spacer 10 is securely disposed at a desired mounting position, and the engaging portion 12 is securely engaged with the engaging portion 22 of the panel end spacer 20.

Furthermore, the engaging portion 22 of the panel end spacer 20 has a hook shape which is mutually engaged with the engaging portion 12 of the flange end spacer 10, and an empty weight of the windshield panel 25 acts in a meshing direction between both the engaging portions 22 and 12. Accordingly, a mutual engagement between the engaging portions 22 and 12 is securely performed. Moreover, the windshield panel 25 is prevented from slipping in a floating direction. Therefore, an accuracy of mounting the windshield panel 25 is further improved.

Further, when the engaging portions 12 and 20 are mutually engaged with each other as mentioned above, the convex and recess portions 23 and 24 in the edges thereof are mutually engaged with each other, so that a positioning of the windshield panel 25 in the right and left directions 32 is performed. Accordingly, an accuracy of mounting the windshield 25 is further improved.

Figure 3:
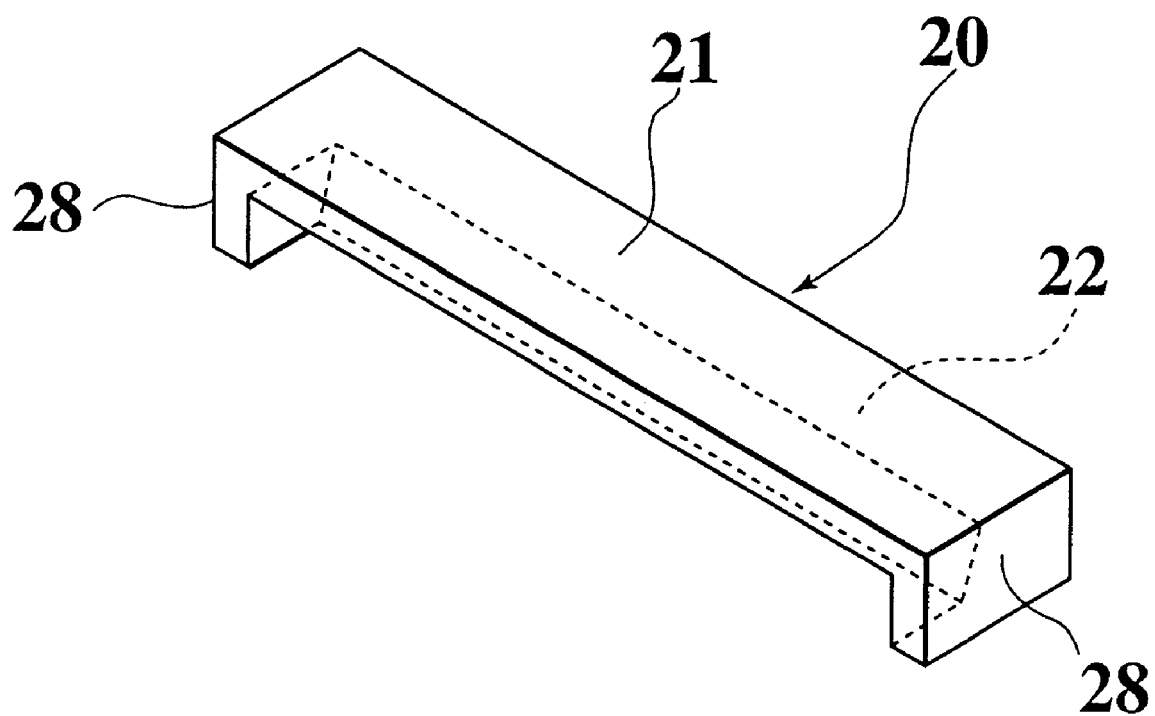
FIG. 3 is a perspective view which shows a spacer close to a panel in accordance with a second embodiment of the present invention.

Next, a second embodiment in accordance with the present invention will be described with reference to FIG. 3. In this case, the same reference numerals are attached to the same elements as those of the first embodiment, and an explanation thereof will be omitted.

The second embodiment is structured such that a side wall 28 engaging with a side surface of the engaging portion 12 in the flange end spacer 10 is formed in both side portions of engaging portion 22 in the panel end spacer 20 in place of the convex and recess portions 23 and 24 in the first embodiment. A positioning of the windshield panel 25 in the right and left direction 32 is performed by an engagement between the side wall 28 of the panel end spacer 20 and the side surface of the engaging portion 12 in the flange end spacer 10. In this case, in an opposing manner to the above, the side wall engaging with the side surface of the panel end spacer 20 may be provided in the flange end spacer 10.

Here, in the first and second embodiments mentioned above, the explanation is given to the structure for mounting the front window panel, however, the present invention is not limited to this, and for example, the same effect is obtained in the case of being applied to a structure for mounting a rear window panel.

What is claimed is:

1. A structure for positioning a windshield panel on a vehicle, comprising:
    a flange arrangement formed about a peripheral edge of an opening portion formed in a vehicle body and in which is closed by the windshield panel, said flange arrangement having a first flange member and a second flange member which are arranged in a mutually overlapping relationship with each other so as to define a hollow portion which has a first opening at one end thereof, the windshield panel having a peripheral edge bonded on the flange;
    a first spacer having an inserting portion and a first engaging portion, the first spacer being fixed to the flange arrangement so that the first engaging portion projects beyond the flange arrangement when the inserting portion is inserted through the first opening into the hollow portion; and
    a second spacer fixed to the peripheral edge of the windshield panel, the second spacer having a second engaging portion engageable with the first engaging portion of the first spacer, and wherein the windshield panel is positioned with respect to the flange arrangement when the first and second engaging portions are engaged with each other.

2. A positioning structure according to claim 1, wherein the first flange member has a plate-like bent portion separate from the second flange member, and wherein the hollow is formed between the bent portion and the second flange member.

3. A positioning structure according to claim 1, wherein the first flange member is extended from a roof panel,
    the second flange member is extended from a roof rail, and
    the second spacer is fixed to an upper portion of the windshield panel.

4. A positioning structure according to claim 1, wherein the first spacer has a hook portion which engages with the flange portion when the inserting portion is inserted into the hollow, so that the first spacer is fixed to the flange arrangement.

5. A positioning structure according to claim 4, wherein the hollow has a second opening which is opposite to the first opening, and
wherein the hook portion projects from the inserting portion and passes through the hollow so as to engage a peripheral edge of the second opening.

6. A positioning structure according to claim 1, wherein the hollow is defined between a first inner surface of the first flange member and a second inner surface of the second flange member, and the inserting portion of the first spacer has a spring piece which is in elastic contact with the second inner surface so as to press the inserting portion against the first inner surface.

7. A positioning structure according to claim 4, wherein the hollow is defined between a first inner surface of the first flange member and a second inner surfer of the second flange member, and the inserting portion of the first spacer has a spring piece which is in elastic contact with the second inner surface so as to press the inserting portion against the first inner surface, and wherein the hook portion is engaged with the first flange member.

8. A positioning structure according to claim 5, wherein the hollow is defined between a first inner surface of the first flange member and a second inner surfer of the second flange member, and the inserting portion of the first spacer has a spring piece which is in elastic contact with the second inner surface so as to press the inserting portion against the first inner surface, and wherein the hook portion is engaged with the first flange member.

9. A positioning structure according to claim 1, wherein the first and second engaging portions have hook shapes which are mutually engageable with each other to prevent the first and second members from moving relative to one another in a first direction substantially parallel to the windshield panel and in a second direction substantially perpendicular thereto.

10. A positioning structure according to claim 1, wherein the flange arrangement includes a notch portion formed in a peripheral edge of one of the first flange member and the second flange member, and wherein the first engaging portion is received within the notch portion when the inserting portion is inserted into the hollow.

11. A positioning structure according to claim 1, wherein an inner surface of the hollow has a groove extending in a direction which is essentially parallel to that in which the inserting portion is inserted, and wherein the inserting portion has projecting a portion inserted into the groove.

12. A positioning structure according to claim 9, wherein the first and second engaging portions have movement restricting portions mutually engageable with each other prevent the first and second spacers from moving in a third direction substantially perpendicular to the first and second directions.

13. A positioning structure according to claim 12, wherein one of the movement restricting portions has a concave shape, and wherein the other of the movement restricting portions has a convex shape which is inserted into the concave shape.

14. A positioning structure according to claim 12, wherein one of the movement restricting portions is formed in a side surface of one of the first and second engaging portions, and wherein the other of the movement restricting portions is formed in a side wall formed in the other of the first and second engaging portions and located opposite the side surface.

15. A method of mounting a windshield panel for a vehicle, comprising the steps of:

mounting a first spacer on a flange arrangement formed about a peripheral edge of an opening portion which is formed in a vehicle body and in which is closed by the windshield panel, the flange arrangement having a first flange member and a second flange member which are arranged in a mutual overlapping relationship with each other so as to define therebetween a hollow portion having a first opening, the first spacer having an inserting portion and a first engaging portion, the first spacer being fixed to the flange arrangement so that the first engaging portion projects beyond an outer surface of the flange arrangement when the inserting portion is inserted into the hollow through the first opening;

engaging the first engaging portion with a second engaging portion of a second spacer to fix the peripheral edge of the windshield panel against the flange; and bonding the peripheral edge of the windshield panel to the flange.

* * * * *